United States Patent

Goo et al.

[11] Patent Number: 5,283,608
[45] Date of Patent: Feb. 1, 1994

[54] CAMERA CAPABLE OF OUTPUTTING BRIGHTNESS AND MEASURED DISTANCE INFORMATION

[75] Inventors: Bonjeong Goo; Taekyeong Yoon, both of Kyeongsangnam-do, Rep. of Korea

[73] Assignee: Samsung Aerospace Industries, Inc., Kyeongsangnam-do, Rep. of Korea

[21] Appl. No.: 892,040

[22] Filed: Jun. 2, 1992

[30] Foreign Application Priority Data

Feb. 7, 1992 [KR] Rep. of Korea ............ 92-01813[U]
Feb. 7, 1992 [KR] Rep. of Korea ............ 92-01814[U]

[51] Int. Cl.$^5$ ................ G03B 13/36; G03B 17/18
[52] U.S. Cl. .................... 354/403; 354/468; 354/471
[58] Field of Search ........... 354/403, 468, 475, 409, 354/484, 471

[56] References Cited

U.S. PATENT DOCUMENTS

| | | | |
|---|---|---|---|
| 4,487,495 | 12/1984 | Kimata et al. | 354/403 |
| 4,556,304 | 12/1985 | Fukuda | 354/403 X |
| 4,591,257 | 5/1986 | Sawano | 354/403 |
| 4,634,254 | 1/1987 | Ogihara et al. | 354/403 |
| 4,723,073 | 2/1988 | Amikura et al. | 354/403 X |
| 4,754,296 | 6/1988 | Neely | 354/409 X |
| 4,843,416 | 6/1989 | Brower | 354/403 |
| 4,855,585 | 8/1989 | Nonaka | 354/403 X |
| 4,998,125 | 3/1991 | Watanabe et al. | 354/403 |
| 5,070,357 | 12/1991 | Kazami et al. | 354/468 |
| 5,136,327 | 8/1992 | Ogawa | 354/484 |

Primary Examiner—W. B. Perkey
Attorney, Agent, or Firm—Francis C. Hand

[57] ABSTRACT

A camera capable of outputting brightness and distance information comprising a microcomputer, a battery checking circuit, an autofocusing circuit, an infrared-emitting circuit, a light receiving element PSD, a light intensity measuring circuit, a LCD driving circuit and a LCD. The camera provides a user with information about an exact distance from an object without using any extra device and with information about present light intensity by outputting to a display device attached to the camera.

7 Claims, 2 Drawing Sheets

CAMERA CAPABLE OF OUTPUTTING BRIGHTNESS AND MEASURED DISTANCE INFORMATION

This invention relates to a camera. More particularly to a camera capable of outputting brightness and measured distance information.

Conventionally, cameras have been provided with a light intensity measuring block which cooperates with a microcomputer to measure environmental light intensity according to a signal from the microcomputer in order to automatically control an exposure time. Namely, the function of the light intensity measuring block was limited merely to control the opening-shutting time of a lens shutter for controlling the exposure time to expose films according to the intensity of the measured light. In these cameras, the function of any LCD attached to the camera was limited to display only the number of exposures in the remaining film, present time and so on.

Therefore, in these previously known cameras, the information about the amount of the measured light is used only to control the exposure time of the film, and not used for any other use. Hence, valuable information is wasted and those who actually need to know an exact intensity of light have to use an extra device.

It has also been known to provide an autofocusing block in cameras in cooperation with a microcomputer to measure the distance from an object to a lense in accordance with a signal out of the microcomputer. In this way, a clear image can be obtained by controlling the lens according to the value of measured distance information and by focusing on the object exactly. However, this information has not been displayed, for example, on an LCD attached to the camera.

Since the signal detected from the autofocusing block is not used for other uses except the use of exact focusing on the object by measuring the distance of the object to be photographed, valuable information is wasted. So, when the user actually wishes to measure an exact distance with a certain object, the user has to use an extra device. This can create a degree of difficulty when measurements are to be taken in a dangerous place an geographically troublesome place.

SUMMARY OF THE INVENTION

Accordingly, it is an object of the invention to provide a high-class camera which can easily supply information to a user regarding the intensity of a measured light.

It is another object of the invention to provide a highclass camera which can measure an exact distance from a camera lense to an object and which can output the measured distance to a display device attached to the camera without using any extra device.

It is another object of the invention to provide a camera capable of displaying brightness and measured distance information.

Briefly, the invention provides a camera which can be used to display brightness and/or distance information at the time of use.

The camera includes a liquid crystal display device or other suitable display device, a battery checking means for checking the voltage remaining in a dry battery power supply and a microcomputer connected with the display device and the battery checking means.

The microcomputer is provided with a lens cover switch for indicating the removal of a lens cover from the camera, a second switch for selectively activating the liquid crystal display device to display information and a release switch for selectively activating the microcomputer to deliver a control signal to the battery checking means in order to activate the battery checking means.

In one embodiment, the camera includes an autofocusing means connected to the microcomputer for receiving an activating signal therefrom. This autofocusing means includes an infrared-emitting means for emitting infrared rays towards an object, a light receiving element (PSD) for receiving infrared light reflected from the object and for outputting a current in proportion to the intensity of reflected infrared light received and an autofocusing block for receiving the current from the light receiving element in order to focus a lens of the camera on the object in dependence on the current and to emit a distance indicating signal to the microcomputer corresponding to the current and containing information indicative of the distance between the object and the lens. In this embodiment the autofocusing means may operate according to a principle of trigonometric levelling.

Still further, the camera includes an LCD driving means which is connected to and between the display device and the microcomputer for receiving the distance information from the microcomputer in order to display a value corresponding to the information as a measure of the distance between the object and the lens.

In another embodiment, the camera is constructed with a liquid crystal display device, a battery checking and a microcomputer as above. In addition, the camera includes a light intensity measuring means for outputting brightness. In this embodiment, the light intensity measuring means is connected to the microcomputer for measuring the environmental brightness of the object in response to receiving an activating signal from the microcomputer to deliver a signal thereto containing information indicative of the measured light intensity for storage therein. The microcomputer is, in turn, connected to the LCD driving block to deliver the information thereto for display on the display device.

In another embodiment, the autofocusing means and the light intensity measuring means can be incorporated in the same camera so that the liquid crystal device is able to display information of one or both of the measured distance e brightness.

DETAILED DESCRIPTION OF A PREFERRED EMBODIMENT

Figure 1:
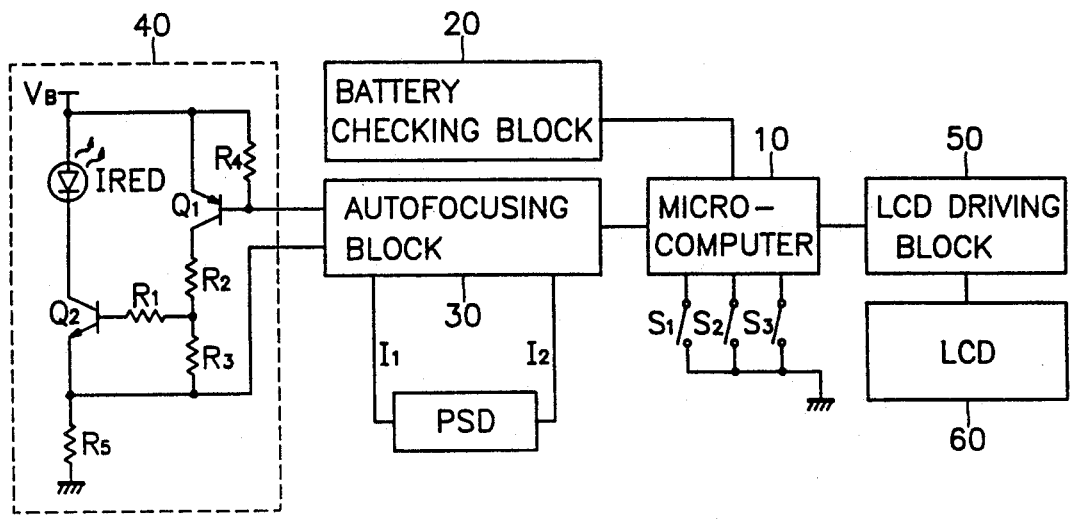
FIG. 1 is a block diagram of a camera to display measured distance information according to one embodiment of the present invention.

Referring to FIG. 1, the camera includes a microcomputer 10 which is constructed to control the operations of all the electronic circuits of the camera. Further, the camera includes a battery checking block 20 for checking the remaining voltage in power supply (not shown), such as a dry battery in the camera. In this respect, the microcomputer 10 has a release switch S1 for selectively activating the microcomputer 10 to deliver a control signal to the battery checking block 20 in order to activate the block 20.

The camera also includes a liquid crystal display device 60 and a LCD driving means or block 50 connected to and between the display device 60 and the microcomputer 10. In this respect, the microcomputer 10 has a second switch S2 for selectively activating the display device 60 via the driving block 50 to display information.

Still further, the microcomputer 10 has a third switch S3 which functions as a lens cover switch for indicating the removal of a lens cover from the camera. In this respect, the switch S3 is turned ON if a lens cover is removed from over a lens.

As shown in FIG. 1, the camera includes an autofocusing means for focusing automatically on an object to be photographed by measuring the distance from the object to the camera in accordance with a signal from the microcomputer 10. This means includes an autofocusing block 30, an infrared-emitting block 40 for emitting an infrared ray toward an object according to a control signal of the autofocusing block 30, and a light receiving element PSD for receiving reflected I-R light from the object and for outputting current in proportion to the intensity of reflected I-R light received by measuring the incidence angle of the infrared rays. The autofocusing block 30 receives the current from the PSD to focus the camera lens and to store corresponding information regarding the measured distance. This information can be emitted via a signal to the LCD driving block 50 for display on the LCD 60 according to the signal to the LCD driving block 50.

The infrared emitting block 40 is constructed as follows: A transistor Q2 with a collector terminal thereof is connected to a cathode terminal of a infrared emitting diode IRED which, in turn, has an anode terminal connected to a power supply $V_B$. An emitter terminal of the transistor Q2 is connected to a terminal of a resistor R5 which has a second terminal thereof connected to ground. The power supply $V_B$ is connected to one terminal of a resistor R4 and to an emitter terminal of a second transistor Q1, and the other terminal of the resistor R4 is connected to a base terminal of the transistor Q1 and then to the autofocusing block 30. A collector terminal of the transistor Q1 is connected to one terminal of another resistor R2. The other terminal of the resistor R2 is connected to one terminal of a resistor R1 with the other terminal thereof connected to a base terminal of the transistor Q2, and to one terminal of a resistor R3 with the other terminal thereof connected to the other terminal of the resistor R5 and then connected to the autofocusing block 30.

The operation of the camera is as follows. The camera is placed in a stand by mode ready to do the next operation by turning ON the lens cover switch S3 connected to the microcomputer 10, if a user first removes a lens cover disposed over a lens of the camera.

Figure 2:
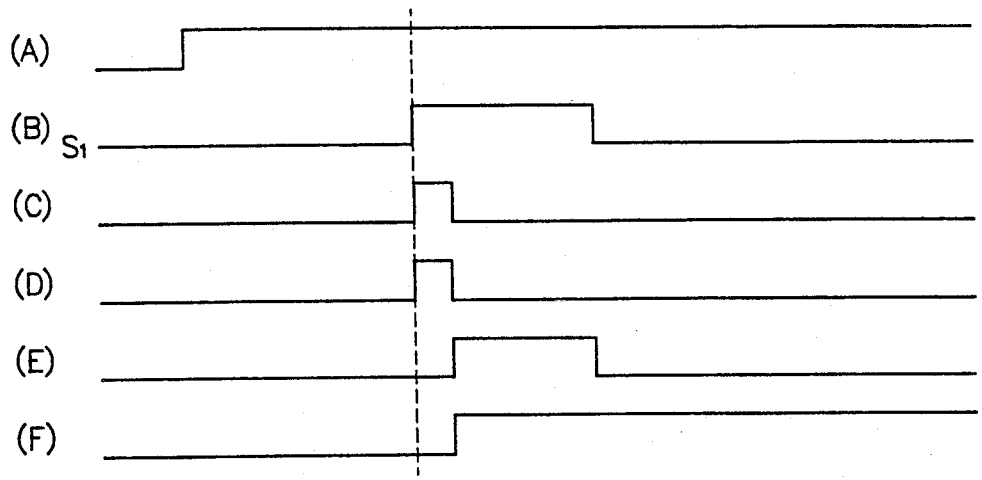
FIG. 2 is an operational waveform chart of the operation of a camera to display measured distance information according to the invention.

In case the user wants to use the LCD 60 in a state that the lens cover S3 is turned ON, as shown in FIG. 2A, the LCD 60 becomes available by turning ON the LCD switch S2. At this time, a caption, "Test mode Distance" is displayed on the LCD 60. However, if any operation is not carried out during a certain time after the LCD switch S2 is turned ON, the LCD switch S2 is automatically restored to an OFF position to stand ready to do the next operation.

But, if the release switch S1 is turned ON to take a photograph within a certain time, as shown in FIG. 2B, the microcomputer 10 outputs a high level signal "H" to the battery checking block 20, as shown in FIG. 2C. Thus, the battery checking block 20 is operated to check the remaining capacity of a dry battery in the camera during about 15 ms of the high level signal "H" being applied, as shown in FIG. 2D. Since it is difficult to measure an exact distance where there is a lack of energy for emitting infrared rays, this mode of the camera is not activated where the capacity of the dry battery is less than the predetermined reference capacity.

The battery checking modes of the above battery checking block 20 can be embodied by using a comparator and an A/D converter.

First, in the case of a comparator, the voltage of the dry battery is divided by resistors and supplied to an inverting terminal of the comparator, i.e., operational amplifier, and the camera is made not to operate in case the battery voltage is less than a reference voltage supplied to a non-inverting terminal of the comparator.

The use of the A/D converter associated with the microcomputer 10 enables the microcomputer 10 to control the operation of the camera in accordance with the level of the remaining battery voltage. In case of a 3 V dry battery, if the remaining capacity of the dry battery is more than 2.8 V, it does not influence on the operation of the camera; if 2.4 V–2.8 V, a warning message is outputted, since it cannot perform an exact operation; and if less than 2.4 V, it is impossible to operate the camera. In the case of a 6 V dry battery, if the remaining capacity of the dry battery is over 4.2 V, it does not influence on the operation of the camera; if 3.8 V–4.2 V, the warning message is outputted; and if under 3.8 V, operating the camera is impossible.

Therefore, in case the voltage is sufficient to operate the camera, the microcomputer 10 outputs the high level signal to an autofocusing control bus for about 220 ms, as shown in FIG. 2E. Thus, the autofocusing block 30 is operated to measure the distance from the object and for focusing automatically on the object.

If the high level is applied to the autofocusing control bus, the autofocusing block 30 turns ON the transistor Q1 by outputting a low level signal "L" to the base terminal of the transistors Q1 of the infrared-emitting block 40 for measuring the distance from the object. As the transistor Q1 turns ON, since the voltage divided by the resistors R2, R3 is applied to the transistor Q2 across the resistor R2, the transistor Q2 is also turned ON. Thus, the infrared-emitting block operates and emits infrared rays to the object. The infrared-emitting diode IRED is repeatedly switched ON/OFF and the PSD outputs the current $I_1$, $I_2$ corresponding to the rays received from the infrared-emitting diode IRED into the autofocusing block 30. Therefore, the microcomputer 10 receives the measured distance information from the autofocusing block 30.

Figure 3:
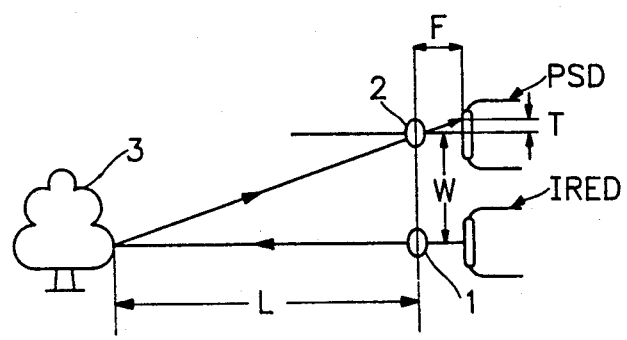
FIG. 3 is a diagram for illustrating the principle of trigonometric levelling.

The distance from the object is measured by principles of trigonometric levelling, using the infrared rays projected from the infrared-emitting block 40, as shown in FIG. 3. Namely, the light receiving element PSD is placed at a predetermined interval from the infrared-emitting diode IRED, an emitted beam collimation lens 1 is placed between the infrared emitting diode IRED and the object 3, and a PSD beam forming lens 2 is placed between the light receiving element PSD and the object on a common axis with the above emitted beam collimation lens 1.

Therefore, the infrared rays projected from the infrared emitting diode IRED are emitted to the object 3 through the emitted beam forming lens 1, and the reflected infrared rays become incident on the light receiving element PSD through the PSD beam forming lens 2. Thus, the light receiving element PSD outputs a current corresponding to the incident angle of the infrared rays inputted to the light receiving element PSD. Therefore, the trigonometric levelling controls a focus by moving a light receiving block for two current amounts $I_1$, $I_2$ outputted from the light receiving element PSD becoming the same amount.

Namely, supposing that a distance between the object 3 and centre of the emitted beam collization lens 1 on an optical axis is "L", a distance between centres of the emitted beam collimation lens 1 and the PSD beam forming lens 2 is "W", a distance between centre of the emitted beam collimation lens 1 and the light receiving element PSD is "F", and a distance between the centre of the PSD beam forming lense 2 and a forming point of the object at the light receiving element PSD is "T", since $L : W = F : T$ can be established, a distance L can be given by $(F \times B)/T$.

Therefore, the microcomputer 10 receives a signal from the autofocusing block 30 of which the output corresponds to the distance from the object 3 measured by the inputted current amounts $I_1$, $I_2$ by the light receiving element PSD through the above-mentioned method. The applied signal is converted to a digital signal by an A/D converter (not shown) in the microcomputer 10 and is stored in a built-in memory and controls the focus by being applied to a motor driving block (not shown) for driving the motor to control the focus.

If the operation of the battery checking block 20 is halted by the inputted signal, as shown in FIG. 2D, the microcomputer 10 operates the LCD driving block 50 by applying the high level signal to the LCD driving block 50, as shown in FIG. 2F.

Therefore, the information which inputted and stored to the microcomputer 10 by the operation of the autofocusing block 30 is outputted to the LCD 60. The LCD 60 can output the measured information by 7 segments using the emitting diode as well as the liquid crystal, and by the other displayers.

Therefore, the user can easily obtain the needed distance even in the difficult area, because the LCD 60 supplies the measured distance information. Also, the above-described functions are added to a fully automatic camera and the highclass camera can be embodied.

Figure 4:
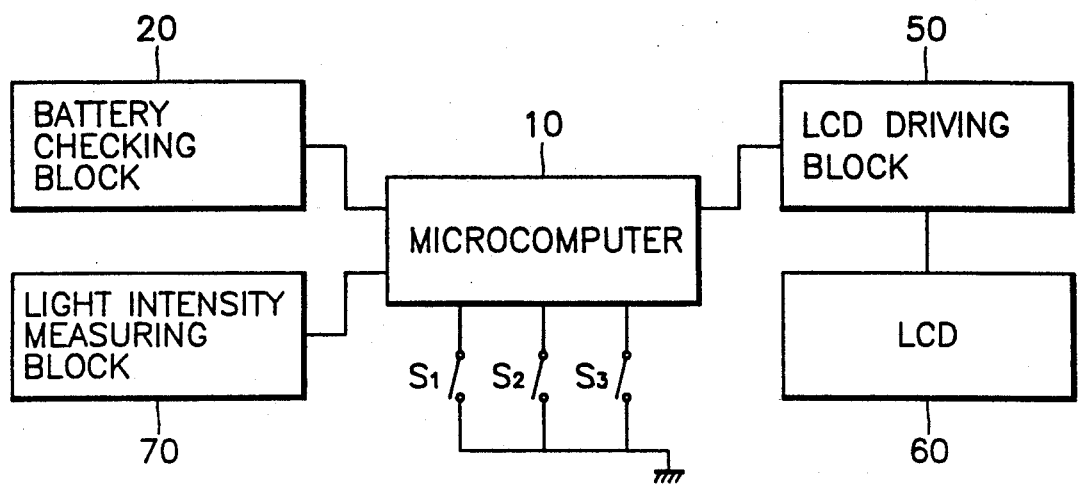
FIG. 4 is a block diagram of a camera outputting brightness information according to another embodiment of the present invention.
Figure 5:
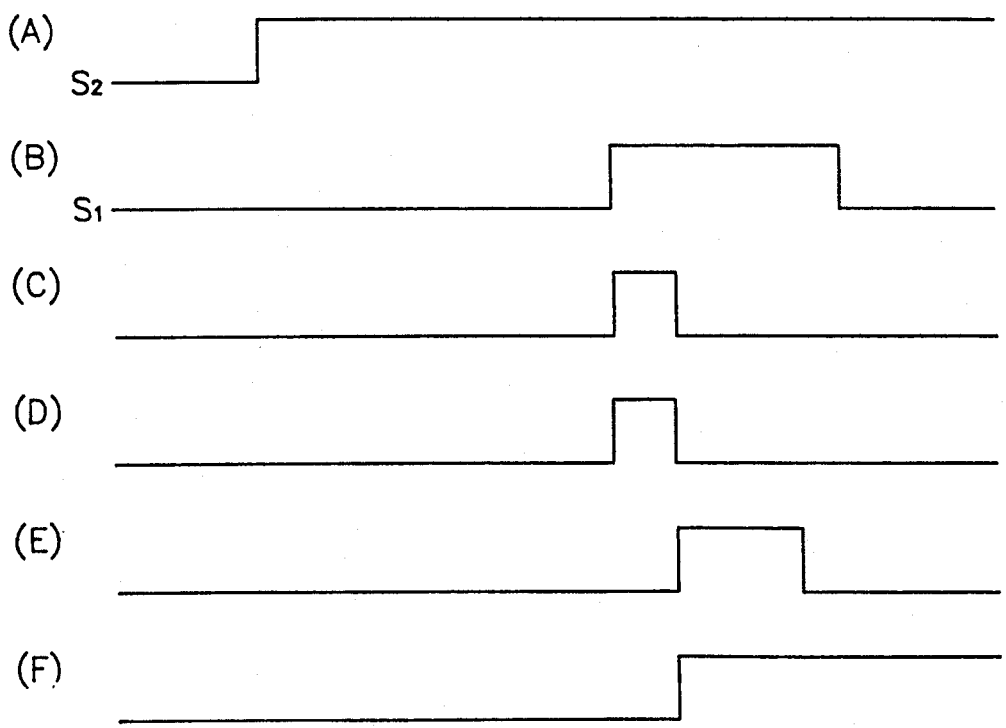
FIG. 5 is an operation waveform chart of the operation of a camera outputting brightness information according to the invention.

FIGS. 4 and 5, wherein like reference characters indicate like parts as above, the camera may be also be provided with a light intensity measuring block 70 to obtain a read-out of the environmental brightness of an object to be photographed. Of note, the light intensity measuring block 70 may be used without the autofocusing block 30 of FIG. 1 and the related circuitry.

As indicated in FIG. 4, the light intensity measuring block 70 or means 70 is connected to the microcomputer for measuring environmental brightness of the object to be photographed in response to receiving an activating signal from the microcomputer 10. This light intensity measuring means 70 is connected with the microcomputer 10 to deliver a signal thereto containing information indicative of the measured light intensity for storage therein. In addition, the LCD driving block 50 and liquid crystal display device 60 are constructed to display the information regarding the information stored in the microcomputer 10 relative to the light intensity which has been measured.

In this embodiment, the camera is operated in a similar manner as described above. That is, after the cover switch S3 has been turned ON, in case that the user wants to use the LCD 60 in a state that the lens cover S3 is turned ON, as shown in FIG. 5A, the LCD 60 becomes available by turning ON the LCD switch S2. At this time, a caption, "Test Mode Lux" is displayed on the LCD 60. However, if any operation is not carried out during a certain time after the LCD switch S2 is turned ON, the LCD switch S2 returns to OFF and stands ready to do the next operation.

But, if the release switch S1 is turned ON to take a photograph within the certain time, as shown in FIG. 5B, the microcomputer 10 outputs a high level signal "H" to the battery checking block 20, as shown in FIG. 5C, and thus, the battery checking block 20 is operated to check the remaining capacity of a dry battery in the camera during about 15 ms of the high level "H" being applied, as shown in FIG. 5D.

Should there be sufficient voltage, the microcomputer 10 outputs the high level signal for about 220 ms, and operates the light intensity block 70, as shown in FIG. 5E. Thus, the light intensity block 70 measures the brightness of the object.

The brightness is measured according to the value inputted to the microcomputer 10 by using a light receiving element SPD (Silicon Photo Diode) in which the current amount is changed in accordance with the light amount, and using a CdS (Cadmium Sulfur Cell) of which a resistor value is varied in accordance with the light amount.

Therefore, the information according to the measured light intensity measuring block 70 through the above-stated method is inputted to the microcomputer 10 which determines whether to use a flash (not shown), or not. The microcomputer 10 stores this information about the light intensity as measured by the light intensity measuring block 70.

The microcomputer 10 operates the LCD driving block 50 by applying a high level signal to the LCD driving block 50, as shown in FIG. 5F, if the operation of the battery checking block 20 is halted by the inputted signal, as shown in FIG. 5D.

Therefore, the information which inputted and stored in the microcomputer 10 by the operation of the light intensity measuring block 70 is outputted to the LCD 60. The LCD 60 can output the measured information by 7 segments using an emitting diode as well as a liquid crystal, and by the other displayers.

As a result, since the user can know the brightness, the user can take a clearer photograph, and can apply the brightness information to a video camera and a CAM coder. Particularly, in case of the CAM coder, the information about the light intensity can be recorded on a tape, and used as a scientific information.

Each measuring device, i.e. distance measuring device and brightness measuring device, can be included in one device, being united each other, and the LCD panel according to this device is designed to display the light intensity information and the measured distance information. In addition, the modification of the LCD driving device can be easily performed using well-known technology in this art.

The invention thus provides a camera with which the user can obtain the light intensity using only the camera without any extra device for measuring the light intensity. This can also be obtained without problems in manufacturing and without increasing the basic cost, since existing devices can be used for the camera. The camera can also be used as a brightness meter, because the value to be measured is varied according to the light intensity.

What is claimed is:

1. A camera comprising
a liquid crystal display device;
a battery checking block to check the voltage remaining in a dry battery power supply;
a microcomputer connected with said display and said battery checking block, said microcomputer having a lens cover switch for indicating removal of a lens cover from the camera, a second switch for selectively activating said liquid crystal display device to display information, and a release switch for selectively activating said microcomputer to deliver a control signal to said battery checking block to activate said block;
an autofocusing means connected to said microcomputer for receiving an activating signal therefrom, said autofocusing means including an infrared-emitting means for emitting an infrared rays toward an object, a light receiving element for receiving infrared light reflected from the object and for outputting a current being in proportion to the intensity of reflected infrared rays received, and an autofocusing block for receiving the current from said light receiving element to focus a lens of the camera on the object in dependence on said current and to emit a distance indicating signal to said microcomputer corresponding to said current and containing information indicative of the distance between the object and the lens; and
an LCD driving means connected to and between said display device and said microcomputer for receiving said distance information from said microcomputer to display a value corresponding to said information as a measure of the distance between the object and the lens.

2. A camera as set forth in claim 1 wherein said infrared-emitting means includes
power supply;
an infrared ray emitting diode having an anode terminal connected to said power supply;
a first transistor having a collector terminal connected to a cathode terminal of said infrared ray emitting diode;
a first resistor having one terminal thereof connected to an emitter terminal of said transistor and another terminal connected to ground;
a second resistor having one terminal thereof connected to said power supply;
a second transistor having an emitter terminal thereof connected to said power supply and a base terminal thereof connected to another terminal of said second resistor and connected to said autofocusing block;
a third resistor having one terminal thereof connected to a collector terminal of said second transistor;
a fourth resistor having one terminal thereof connected to a second terminal of said third resistor and a second terminal thereof connected to a base terminal of said first transistor; and
a fifth resistor having one terminal thereof connected to said second terminal of said third resistor and a second terminal thereof connected to said one terminal of said first resistor and connected to said autofocusing block.

3. A camera as set forth in claim 1 wherein said display device displays measured information in 7 segments.

4. A camera as set forth in claim 1 which further comprises a light intensity measuring means connected to said microcomputer for measuring the environmental brightness of the object in response to receiving an activating signal from said microcomputer, said light intensity measuring means being connected with said microcomputer to deliver a signal thereto containing information indicative of the measured light intensity for storage therein, said microcomputer being connected to said driving block to deliver said information thereto for display on said display device.

5. A camera as set forth in claim 4 wherein said display device displays the information of the measured light intensity in 7 segments.

6. A camera comprising
a liquid crystal display device;
a battery checking block to check the voltage remaining in a dry battery power supply;
a microcomputer connected with said display device and said battery checking block, and lens cover switch for indicating removal of a lens cover from the camera, a second switch for selectively activating said liquid crystal display device to display information, and a release switch for selectively activating said liquid crystal display device to display information, and a release switch for selectively activating said microcomputer to deliver a control signal to said battery checking block to activate said block;
a light intensity measuring means connected to said microcomputer for measuring the environmental brightness of the object in response to receiving an activating signal from said microcomputer, said light intensity measuring means being connected with said microcomputer to deliver a signal thereto containing information indicative of the measured light intensity for storage therein; and
an LCD driving means connected to and between said display device and said microcomputer for receiving said information therefrom for display on said display means.

7. A camera as set forth in claim 6 wherein said display device displays the information of the measured light intensity in 7 segments.

* * * * *

UNITED STATES PATENT AND TRADEMARK OFFICE
CERTIFICATE OF CORRECTION

PATENT NO. : 5,283,608

DATED : February 1, 1994

INVENTOR(S) : Bonjeong Goo Et Al

It is certified that error appears in the above-identified patent and that said Letters Patent is hereby corrected as shown below:

```
Column 1, line 31, "lense" should be -lens-
Line 46, "an" should be -or-
Line 55 "lense" should be -lens-
Column 2, line 36 before "and", insert -means-
Line 51, "e" should be -and the-
Column 5, line 30 "lense" should be -lens-
Column 6, line 57 after "which" insert -is-
Column 7, line 24 after "display" insert -device-
Line 37 "an" should be deleted
Line 58 before "power supply" insert -a-
Col. 8, line 41, "and" (2nd occurrence) should read --said microcomputer having
a--.  Lines 45 to 47 cancel "and a release...information,"
LIne 31, "block" should be --means--.
```

Signed and Sealed this

Fifth Day of July, 1994

Attest:

BRUCE LEHMAN

Attesting Officer     Commissioner of Patents and Trademarks